United States Patent [19]

Beutier et al.

[11] Patent Number: 4,891,193

[45] Date of Patent: Jan. 2, 1990

[54] PROCESS FOR THE SEPARATION OF MOLYBDENUM BY A RESIN ROUTE

[75] Inventors: Didier Beutier; Yves Le Quesne, both of Paris, France

[73] Assignee: Compagnie Francaise De Mokta, Velizy Villacoublay, France

[21] Appl. No.: 237,681

[22] Filed: Aug. 25, 1988

Related U.S. Application Data

[63] Continuation of Ser. No. 6,189, Jan. 23, 1987, abandoned.

[30] Foreign Application Priority Data

Jan. 23, 1986 [FR] France .............................. 86 00993

[51] Int. Cl.$^4$ .............................................. C01G 39/00
[52] U.S. Cl. .............................. 423/54; 423/DIG. 14; 75/101 BE; 75/121; 210/688; 210/912
[58] Field of Search .................... 423/54, DIG. 14; 75/101 BE, 121; 210/688, 912

[56] References Cited

U.S. PATENT DOCUMENTS

| 3,415,616 | 12/1968 | Agers et al. | 423/54 |
| 3,449,066 | 6/1969 | Swanson | 423/54 |
| 3,821,351 | 6/1984 | Lucid | 423/54 |

FOREIGN PATENT DOCUMENTS

0494348 12/1975 U.S.S.R. .............................. 423/54

OTHER PUBLICATIONS

Hervé, D. "Ion Exchangers in Hydrometallurgy" Royal Draft Translation of Industrie Mineral Issue #3, 1979.

*Primary Examiner*—Robert L. Stoll
*Attorney, Agent, or Firm*—Fleit, Jacobson, Cohn, Price, Holman & Stern

[57] ABSTRACT

A process for the separation of molybdenum present in a sulfuric solution, in which the sulfuric solution is placed in contact with a stationary phase whose active group contains an oxime group, and the stationary phase is eluted using an alkaline solution.

6 Claims, No Drawings

PROCESS FOR THE SEPARATION OF MOLYBDENUM BY A RESIN ROUTE

This application is a continuation, of application Ser. No. 006,189, filed Jan. 23, 1987, now abandoned.

The present invention relates to a process for the separation of molybdenum present in sulfuric solutions. It relates more particularly to a method for the extraction of molybdenum which is selective with respect to uranium and, where appropriate, with respect to amphoteric elements such as arsenic, vanadium and the like.

In most processes for recovering uranium from its ores, the said ore is leached with sulfuric acid in the presence, if appropriate, of an oxidizing agent such as hydrogen peroxide or chlorates, in order to oxidize all the uranium IV to uranium VI. The leachate thus produced is subjected to a liquid-liquid extraction or to an extraction using resin, which involves amino groups. During this extraction, the molybdenum is extracted together with uranium. The very high affinity of molybdenum for the amine makes it extremely difficult to reextract, with the result that molybdenum accumulates in the solvents or in the resins and this, on the one hand, reduces the capacity of the solvents and, on the other hand, causes scums to form at the interfaces between the solvent and the reextraction solution. The only way to remove the molybdenum consists of a complete regeneration of the solvent in a basic medium; this regeneration is costly in reactants and leads to losses of uranium. Furthermore, when the molybdenum is at a high concentration in the aqueous phase, this also applies to the organic phase, and results in its being partially eluted when the reextraction is carried out. This elution leads to contamination of the uranium and to a major loss of its commercial value.

Thus, molybdenum, which is almost always associated with uranium, represents a considerable inconvenience in the processes for upgrading this metal. In some cases, the concentration of molybdenum is so high that the upgrading of this metal may be economically profitable. The value at stake is sufficiently high for numerous studies to have been carried out and for numerous processes to have been proposed to avoid this problem.

A first group of processes which have been proposed consists in extracting uranium and molybdenum with an amino solvent and then performing a reextraction using an acidic solution of an alkali metal or alkaline-earth metal chloride in the presence of an oxidizing agent. This stage is then followed by a reextraction of the residual molybdenum using alkali metal carbonate. A process of this kind, described in the article of the ISEC, Toronto, September 77 (B. Scalino et al) and in French Pat. No. 2,484,989, while making it possible to overcome the scum formation and to improve the separation of uranium from molybdenum, does not do away with either the need for a regeneration of the solvent or a high usage of costly reactants (oxidizing agent and alkali metal carbonate). Furthermore, it does not permit molybdenum to be upgraded and increases the usage of extractant, since it is known that amines are highly sensitive to oxidation.

Another group of processes, such as that described in French Pat. No. 2,451,891, tries to solve the problem by extracting molybdenum using an extractant of the same type as the extractant for uranium, namely, a secondary or tertiary amine. This solution is, on the one hand, costly, since in each extraction cycle it requires a complete regeneration of the molybdenum-bearing amine in order to recover this metal effectively therefrom and, on the other hand, it is very laborious when the concentrations of molybdenum are low.

Lastly, a third group of processes proposes a selective extraction of molybdenum using an anion exchange resin or activated charcoal, prior to that of uranium. Processes of this kind are described, for example, in the publication IEA, Volume 292, 1973 (H. T. Matsuda et al) and in French Pat. Nos. 2,414,478 and 2,531,060. The proposed anionic resins are weak resins in which the groups are secondary or tertiary amines. However, although they are selective with respect to uranium, these resins are not sufficiently selective, and this means either that a proportion of uranium is fixed on the resin and greatly complicates the uranium recovery circuits, or that molybdenum is incompletely fixed and continues to interfere with the liquid-liquid extraction. It is difficult, furthermore, to obtain a total elution.

With regard to the fixation of molybdenum on activated charcoal, fixation tests show good capacities (a capacity of 90 grams per liter in the case of a solution containing 0.42 grams per liter). However, a process of this kind is, on the one hand, relatively unsuitable for high flow rates and, on the other hand, does not solve the problem of the remaining impurities, and this makes it very difficult to upgrade the molybdenum present in the medium.

Taking all the above-mentioned into account, the purpose of the present invention is to find a process capable of selectively fixing molybdenum with respect to uranium and, if appropriate, iron, arsenic, phosphorus, silicon and vanadium.

Another purpose of the present invention is to find a process of the above-mentioned type which permits molybdenum to be readily recovered, and the extractants used to be readily regenerated.

These purposes and others which will appear hereinafter are achieved by means of a process for the separation of molybdenum present in a sulfuric solution, comprising:

(a) placing said sulfuric solution in contact with a stationary phase whose active group contains an oxime group;

(b) eluting said stationary phase using an alkaline solution.

The elution stage (b) is preferably performed using a solution whose pH is greater than 10. As eluent solution there may be chosen alkali metal salt or ammonium hydroxides and carbonates of these same cations. Solutions of alkali metal hydroxides whose concentration is between 0.1N and the solubility limit will preferably be chosen. A good compromise consists in choosing a concentration of between 0.5 and 2N. Since sodium hydroxide is one of the least expensive bases, it may be satisfactory to choose this alkali metal hydroxide.

Insofar as the fixation stage (a) is concerned, it is advantageous to fix the pH of the sulfuric solution at a value of less than 2, preferably less than 1. However, for reasons of economy, it is difficult to acidify this solution excessively, unless it is recycled into the process.

In order to produce an eluate which is as pure as possible with respect to molybdenum, it may be desirable to precede stage (b) by a washing of the stationary phase using a sulfuric solution whose concentration is greater than 1M.

The stages (a) and (b), and the optional washing stage, are preferably carried out at a temperature between ambient temperature and 100° C. and at atmospheric pressure.

The resins chosen are those described in the European Patent Application published under the number 0,076,404, preferably the amid-oxime resin.

The eluate containing molybdenum is advantageously acidified to a pH which, after the addition of an alkaline-earth metal salt, allows the molybdenum to be precipitated in the form of an alkaline-earth metal molybdate.

The following examples, which do not imply any limitation, enable the specialist to better apprehend the various parameters of the process according to the invention. The resin used in the examples was Duolite ES 346 which is a resin of macroporous structure, whose polystyrenic frame, crossed with DVB, comprises chelating groups. The functional groups are principally of amidoximes of the general formula:

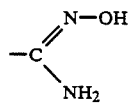

Due to its reticulated tridimensional structure, the Duolite ES 346 is insoluble in aqueous and organic solvents.

EXAMPLE 1

The fixations are performed in a stirred beaker, for a period of 30 minutes, a number of resin/liquid mass ratios being tried and with identical concentrations of initial aqueous solution, which are equal to 0.82 gram per liter of uranium, 0.92 gram per liter of iron, 12 milligrams per liter of molybdenum, and 15 grams per liter of sulfuric acid. The concentrations in the final solutions are given in the following table:

| S/L | [Mo] mg/l | [U] g/l | $\frac{\text{[Mo] solution}}{\text{[U] solution}}$ | $\frac{\text{[Mo] resin}}{\text{[U] resin}}$ | $\frac{\text{[Mo] resin}}{\text{[Mo] solution}}$ |
|---|---|---|---|---|---|
| 1/100 | 5 | 0.81 | $6.2 \cdot 10^{-3}$ | 0.70 | 140 |
| 1/50 | 3 | 0.78 | $3.8 \cdot 10^{-3}$ | 0.22 | 200 |
| 1/10 | <0.5 | 0.57 | $<10^{-3}$ | 0.05 | >240 |
| 1/5 | <0.5 | 0.47 | $<10^{-3}$ | 0.03 | >120 |

Following this test, it is noted that it is possible to obtain a ratio between the concentrations of molybdenum and of uranium which is more than 100 times greater in the resin than in the aqueous solution.

EXAMPLE 2

In this test, we have searched for the maximum fixation of molybdenum on the resin from a concentrated molybdenum solution. This experiment consists of several contacts in a stirred beaker, with a constant solid/liquid mass ratio equal to 1/50 and with variable concentrations in the feed solution.

The initial aqueous solution has the concentrations: 0.82 gram per liter of uranium, 100 milligrams per liter of molybdenum, 0.92 gram per liter of iron and 15 grams per liter of sulfuric acid.

The concentrations of the leaving aqueous phases are given in the following table:

| Contact No. | Entering | Leaving | [Mo] mg/l | [U] mg/l | $\frac{\text{[Mo] resin}}{\text{[Mo] solution}}$ |
|---|---|---|---|---|---|
| 1 | ψA0 | ψA1 | 43 | 0.76 | 66 |
| 2 | ψA1 | ψA2 | 13 | 0.69 | 115 |
| 3 | ψA2 | ψA3 | 2 | 0.61 | 275 |
| 4 | ψA3 | ψA4 | <1 | 0.56 | |
| 5 | ψA4 | ψA5 | <1 | 0.51 | |

In these results, the resin can fix up to 3.5 grams per liter of molybdenum and can have a molybdenum partition coefficient of the order of 300.

EXAMPLE 3

In this test, we have investigated the process of elution, in a stirred beaker, of a resin charged with molybdenum, uranium and iron, with variable concentrations of sulfuric acid and sodium hydroxide solutions.

The resin is charged with 0.8 gram per liter of molybdenum, 1.95 grams per liter of uranium, and 5.7 grams per liter of iron. The solid/liquid volume ratio is constant and equal to 1/10.

The final concentrations of the aqueous phases after a sulfuric elution followed by a sodium hydroxide elution are given in the following table:

| $H_2SO_4$ g/l | [Mo] mg/l | [U] g/l | [Fe] g/l | NaOH N | [Mo] mg/l |
|---|---|---|---|---|---|
| 25 | <1 | 0.12 | 0.17 | 0.6 | 19 |
|  |  |  |  | 1 | 40 |
| 50 | <1 | 0.15 | 0.29 | 0.1 | 18 |
|  |  |  |  | 0.5 | 34 |
|  |  |  |  | 1.0 | 41 |
|  |  |  |  | 5.0 | 41 |
| 100 | <1 | 0.18 | 0.36 | 0.1 | 22 |
|  |  |  |  | 0.5 | 30 |
|  |  |  |  | 1.0 | 32 |
|  |  |  |  | 5.0 | 38 |
| 200 | <1 | 0.19 | 0.37 | 0.5 | 39 |
|  |  |  |  | 1.0 | 37 |

These results show that the resin is well eluted of uranium and iron by the sulfuric acid at a concentration of 100 grams per liter and of molybdenum by 1N sodium hydroxide.

Other tests have shown that molybdenum is very poorly desorbed from the resin by solutions of sodium carbonate, aqueous ammonia and ammonium carbonate. The best results are obtained using sodium hydroxide elution.

EXAMPLE 4

In this example we have attempted the fixation, in a stirred beaker, of the elements in question at different concentrations of iron III and of iron II and at different redox potentials.

| Iron entering | [Mo] g/l | [U] g/l in the resin | [Fe] g/l | Potential /ECS = mV |
|---|---|---|---|---|
| Fe = 0 | 0.19 | 4 | 0 | 70 |
| $Fe^{3+}$ = 50 mg/l | 0.19 | 3.6 | 0.35 | 270 |
| $Fe^{3+}$ = 200 mg/l | 0.19 | 3.4 | 1.1 | 410 |
| $Fe^{3+}$ = 500 mg/l | 0.19 | 3.1 | 2.2 | 480 |
| $Fe^{2+}$ = 50 mg/l |  | 3.5 | 0.05 | 110 |
| $Fe^{2+}$ = 200 mg/l |  | 3.4 | 0.15 | 110 |
| $Fe^{2+}$ = 500 mg/l | 0.18 | 3.4 | 0.3 | 110 |
| $Fe^{2+}$ = 1,000 mg/l |  | 3.5 | 0.5 | 110 |

The molybdenum fixation is not enhanced by the presence of iron III and of iron II. The resin shows good selectivity for molybdenum in relation to iron. The solution potentials do not lead to a change in molybdenum fixation.

It is noted that iron fixation takes place at the expense of uranium and that iron III is fixed better than iron II.

What is claimed is:

1. A process for the selective separation of molybdenum present in a sulfuric solution having a pH under 2 and containing molybdenum and at least one of the elements selected from the group consisting of uranium, iron, arsenic, phosphorus, silicon and vanadium comprising:

(a) contacting said sulfuric solution with a stationary phase comprising a resin having a reticulated, three-dimensional structure and an active group containing an amid-oxime group of the general formula:

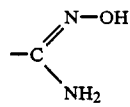

immobilized on said resin to selectively separate molybdenum from at least one of said elements; and (b) eluting said stationary phase with an alkaline solution to recover molybdenum.

2. The process of claim 1 wherein the pH is under 1.

3. The process of claim 2 wherein the stationary phase is washed with sulfuric acid having an acidity higher than 1M between steps (a) and (b).

4. The process of claim 1 wherein the alkaline solution is an alkali metal hydroxide solution whose concentration is between 0.1N and the solubility limit.

5. The process of claim 4 wherein the concentration of the alkali metal hydroxide solution is between 1.5 and 2N.

6. The process of claim 1 wherein said resin is a polystyrene crosslinked with divinylbenzene.

* * * * *